Patented Nov. 9, 1937

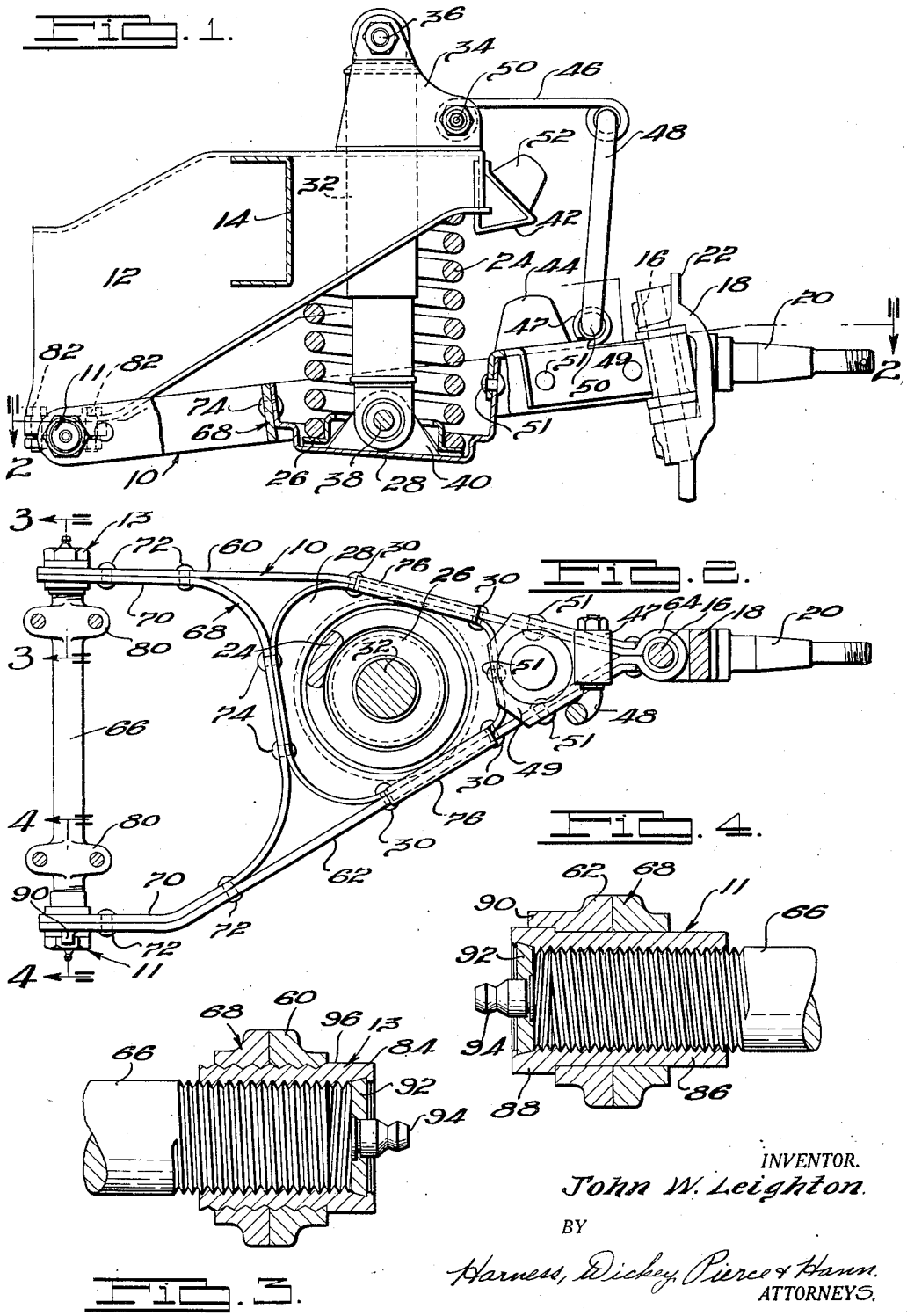

2,098,874

UNITED STATES PATENT OFFICE 2,098,874

INDIVIDUAL SUSPENSION

John W. Leighton, Port Huron, Mich.

Application November 25, 1935, Serial No. 51,396

6 Claims. (Cl. 267—20)

The present invention relates to wheel suspensions, and particularly to constructions of the individually sprung type.

It is an object of the present invention to provide an individual wheel suspension so constructed that a change in the relative position of the vehicle wheels and the frame, such as results from the tilting of a vehicle in rounding a curve, automatically causes the wheels to slant into the curve.

It is a further object of the present invention to provide a construction as above stated in which, in rounding a curve, the upper edge of the inside vehicle wheel swings outwardly from the frame and the upper edge of the outside vehicle wheel swings inwardly with respect to the frame.

It is a further object of the present invention to provide a construction as above stated in which each vehicle wheel is suspended from the frame through a single wishbone member.

It is a further object of the present invention to provide a construction as above stated in which the wishbone is pivoted at one end to the vehicle frame and a load transmitting spring is interposed between the frame and a point intermediate the ends of the wishbone.

It is a further object of the present invention to provide a construction as above stated, in which a tilting of the vehicle frame causes a corresponding tilting of the wishbone, and thus causes the associated wheel to lean inwardly or outwardly with respect to the frame.

It is a further object of the present invention to provide a vehicle suspension of the individually sprung type, embodying improved means to limit upward movement of the vehicle frame with respect to a wheel supporting wishbone.

It is a further object of the present invention to provide an improved wishbone, and method of manufacturing the same, formed of pressed metal parts.

With the above and other objects in view, which appear in the following description and in the appended claims, an illustrative embodiment of the present invention is shown in the accompanying drawing, throughout the several views of which corresponding reference characters are used to designate corresponding parts, and in which:

Fig. 1 is a fragmentary view in elevation of a preferred embodiment of the present invention;

Fig. 2 is a view in plan, taken along the line 2—2 of Fig. 1;

Fig. 3 is a fragmentary sectional view taken along the line 3—3 of Fig. 2; and

Fig. 4 is a fragmentary sectional view taken along the line 4—4 of Fig. 2.

In the illustrated form of the present invention, each individually sprung wheel is suspended from the vehicle frame through a single wishbone, of improved construction, and described in more detail below. The inner end of each wishbone is pivotally connected to the under side of the frame at a point spaced from the longitudinal center line of the latter, the connection being such as to permit relative movement between the frame and the wishbone in a vertical plane. The illustrated arrangement is designed for front wheel suspensions, and the outer end of each wishbone, accordingly, is arranged to form a bearing for a king pin, to which a knuckle bracket and wheel spindle are pivotally connected to permit steering of the vehicle. One end of a load spring individual to each wishbone is seated against the vehicle frame, and the other end is seated in a pan secured to the wishbone.

In operation, a tilting of the vehicle frame, such as occurs during the rounding of a curve, causes the side of the frame on the outside of the curve to move downwardly with respect to the outside wishbone, and the frame portion on the inside of the curve to move upwardly with respect to the inside wishbone. The downward tilting movement causes a corresponding downward movement of the inner end of the corresponding wishbone, which causes a corresponding tilting of the associated spindle, and causes the top of the associated wheel to slant inwardly towards the frame. The upward tilting of the frame causes a corresponding upward movement of the inner end of the corresponding wishbone and so causes the inside wheel to slant outwardly at the top with respect to the frame. In operation, accordingly, the wheels each slant into a curve, much in the manner of the wheels of motorcycles and the like.

The tilting action has been found to materially improve the stability of vehicles during operation, and to also substantially reduce tire wear by eliminating any slippage between the tires and the roadway, normally incidental to the rounding of a curve. The broader aspects of this feature of the present construction are claimed in the co-pending application of the present applicant Serial Number 39,986, filed July 18, 1935, which described an alternative construction, embodying a pair of spaced wishbones associated with each of the wheels.

In further accordance with the illustrated form of the present invention, an improved and simply applied connection is formed between each wishbone and the frame to limit upward movement of the frame with respect to the wishbone. The limiting mechanism comprises a pair of pivotally connected links, which are also pivotally connected to the frame and to the wishbone respectively. Normally, these two links are at a substantial angle to each other, but a raising of the frame with respect to the wishbone causes the links to straighten out, and ultimately to provide a positive mechanical limit to the movement. A rubber bumper is also preferably provided to cushion the limiting movement.

A further feature of the illustrated construction is the provision of a wishbone formed entirely of metal stampings, which may be readily and economically manufactured, and which, while being sufficiently rigid for satisfactory operation, is also sufficiently resilient to enable it to absorb a certain amount of the shock of operation. As illustrated, the wishbone comprises a stamping bent to provide a pair of spaced diverging arms and an eye. The eye forms a bearing for the previously mentioned king pin. Openings are formed in the ends of the arms, within which a shaft is secured by a bearing connection which is preferably of the freely rotatable threaded type. The shaft in turn is secured to the under side of the vehicle frame by suitable brackets. Preferably, and as illustrated, a stiffening strut is connected between the legs at an intermediate point of the wishbone. The strut comprises a length of stamped metal of generally U-shape, the legs of which are suitably secured to the wishbone legs. The previously mentioned pan, which forms a seat for the vehicle load springs, is secured to the opposing legs of the wishbone, and also to the strut. A seat provided with an eye to provide a threaded bearing connection with the previously mentioned limiting links, is also secured between the opposing legs of the wishbone.

Considering the above mentioned elements in more detail and referring to the drawing, the inner ends of the arms of each wishbone 10 are pivotally connected, by bearing assemblies designated 11 and 13, to the underside of a cross member 12, of downwardly directed channel shape, which forms a cross connection between the vehicle frame member 14 and the corresponding opposite frame member (not shown); and the outer end thereof supports a king pin 16 which forms a conventional pivotal support for a knuckle bracket 18 and spindle 20. As will be understood, a vehicle wheel (not shown) may be rotatably mounted upon the spindle 20. An illustrative steering connection, which may be arranged in any conventional way, is represented by the element 22. It will be understood that the spindle and king pin assembly is such as to provide the usual castering angle for the wheel, and that the assembly for the opposite front wheel is correspondingly arranged. One end of a usual load spring 24, individual to each wheel, is seated within the cross member 12, and the lower end thereof is seated upon a collar 26 secured within the pan 28, which, in turn, is suitably secured to the wishbone 10 by the rivets 30. A shock absorber is preferably utilized in conjunction with each spring 24, and may be of conventional construction, such, for example, as the illustrated bicycle pump type 32, the upper end of which is pivotally secured to a clevis 34, by pin 36, and the lower end of which is correspondingly pivotally secured by pin 38 within a clevis 40 struck upwardly from the base of pan 28.

Each outer end of frame 12 is preferably provided with a bumper 42 which cooperates with a rubber buffer 44 to limit downward movement of frame 12 with respect to the associated wishbone 10. Upward movement of frame 12 with respect to wishbone 10 is correspondingly limited, in accordance with the illustrated construction, by the pair of pivotally connected links 46 and 48. Links 46 and 48 are also pivotally connected to the previously mentioned clevis 34 and to wishbone 10 respectively by the connections designated generally 50, and thus are freely rotatable with respect to each other and with respect to the frame and wishbone respectively. The connections 50 may be arranged in various ways but are preferably of the threaded type disclosed and claimed in Patent No. 1,924,448, granted August 29, 1933, to the present applicant. The details are omitted in order to simplify the drawing. An additional rubber buffer 52 secured upon the upward and angularly disposed face of the bumper 42 cooperates with the link 46 to resiliently limit the upward motion of frame 12. The eye 47 to which the lower end of link 48 is connected, is formed in a plate 49 which is suitably secured to wishbone 10 by rivets 51.

In response to an upward movement of frame 12 with respect to either wishbone, the associated links 46 and 48 move from the illustrated and normal positions to positions in which the angle between them is reduced. At a predetermined point in this movement, represented by the desired limit to the upward movement of frame 12, buffer 52 is engaged by the underside of links 46, thus preventing further rotation of the latter, and correspondingly interrupting the upward movement of the frame. It will be evident that through use of independent motion limiting devices for the frame, the load springs may be freely seated between both the frame and the pans, thus simplifying the assembly of the springs with these members. It will also be evident that the particular motion limiting mechanism illustrated may be readily and economically manufactured and assembled with the frame and the wishbones.

Considering the construction and mounting of wishbone 10 in more detail, it comprises a single stamping bent to form a pair of divergent legs 60 and 62, and the eye 64. The inner ends of legs 60 and 62 are bent so that they are disposed in spaced parallel relationship. As previously stated, the eye 64 forms a journal for the king pin 16, and the inner ends of the arms 60 and 62 are provided with openings to accommodate the previously mentioned bearing assemblies designated generally 11 and 13, through which wishbone 10 is connected to the cross bar 66. The strut 68, also preferably formed of stamped metal, is bent to define the legs 70, which correspond in shape to the legs 60 and 62 respectively, and are secured thereto by the rivets 72. The previously mentioned pan 28 is secured to arms 60 and 62 and strut 68 by the previously mentioned rivets 30 and rivets 74. Additional support for pan 28 is afforded by the outwardly turned flanges 76 thereof, which bear against the upper edges of the arms 60 and 62.

The cross bar 66 is provided with a pair of spaced integrally formed brackets 80, through which it is secured to the underside of the frame member 12 by the studs 82, at a point to the right of the longitudinal axis of the vehicle frame as viewed in Fig. 1. The respective ends of bar 66 are externally threaded, as shown in the detailed Figures 3 and 4. The threaded bearing connections 11 and 13 are preferably of the alternate type as shown and described in the copending application of the present applicant Serial No. 698,715, filed November 18, 1933. The connection 11 includes the bushing 84, which is provided with internal threads which mate with a bearing fit with the corresponding threads formed on the associated end of bar 66. Bushing 84 is also provided with external threads of the same pitch, but cut substantially lighter than the internal threads, which loosely mate with corresponding threads formed in the end of arm 62 and the strut 68. The connection 13 is similarly constructed with the exception that the bushing 86 is adapted to be slidably received within the end 10 of the arm 60 and strut 68. Bushing 86 is provided with a hex head 88, which engages a locking lug 90 when the parts are in assembled position to prevent rotation between bushing 86 and arm 60 and strut 68. Preferably, the ends of bushings 84 and 86 are closed by welch washers 92 which are constructed to accommodate the usual lubricant fittings 94.

In assembling the parts, the arm 60, for example, is moved over the associated end of cross bar 66 far enough to permit the other arm 62 to be swung to a position in which the opening therein is in alignment with the associated end of bar 66. Thereafter, the wishbone 10 is centered with respect to bar 66, and the bushing 86 is threaded on to the end of cross bar 66. When the inner face of the hex nut 88 engages the locking lug 90 on arm 60, further rotation of the former causes cross bar 66 to move outwardly through the corresponding opening. The threading of bushing 86 is continued until bushing 86 reaches approximately the final desired position on cross bar 66. At this time, one face of the hex nut 88 is brought to the position shown in Fig. 2, in which it can be slid under the locking lug 90, and bushing 86 and cross bar 66 may be slid through the opening in arm 60 and strut 68 to substantially the original aligned position. After being thus slid to the aligned position, lug 90 acts to positively prevent further rotation of bushing 86. Thereafter, bushing 84 may be threaded on the associated end of cross bar 86 and into the cooperating opening in arm 62 and strut 68. Bushing 84 is turned until the shoulder formed by the hex head 96 thereof engages the outer face of arm 62. At this time, the lightly cut external threads on bushing 84, and correspondingly cut internal threads in arm 62 and strut 68 lock together by a jamming action, positively preventing further rotation of bushing 84.

As previously stated, the pitches of the external and internal threads of bushings 84 are substantially the same, so that during the threading in of bushing 84, substantially no movement of cross bar 66 occurs. Any slight movement occurring, however, because of manufacturing tolerances or the like, is taken up by the slidable connection between bushing 86 and arm 60 and strut 68, and does not change the spacing between the inner ends of arms 60 and 62. It has been found in practice, that the resilient characteristics of the stamped metal wishbone 10 are such that the wishbone may itself absorb any such movement of cross bar 66. Preferably, however, the alternate types of threaded bearing connection constructions are utilized, in order to reduce the stresses which would otherwise be imposed on the arms 60 and 62.

Considering the wheel tilting action of the wish-bones, it will be understood that any tilting of the vehicle frame 12 occurring during the rounding of a curve for example, takes place about the longitudinal center line of the frame as an axis. Since, as stated, the connection between the inner end of each wishbone is spaced from the longitudinal axis of the vehicle, it will be evident that a downward tilting of the right hand end of the vehicle frame 12, as viewed in Fig. 1, causes a corresponding downward movement of the inner end of the corresponding wishbone 10. This downward tilting of the inner end of wishbone 10 causes a corresponding tilting of spindle 20 and hence causes the top of the associated wheel (not shown) to lean inwardly with respect to the frame. Similarly, an upward tilting of the right hand end of frame 12, as viewed in Fig. 1, causes an outward tilting of the top of the wheel with respect to the frame. It will be seen, accordingly, that when, in rounding a curve, the outside frame side tilts downwardly, and the inside frame side tilts upwardly, these tilting movements cause the inside and outside wheels to lean into the curve.

Although a specific embodiment of the present invention has been shown and described, it will be evident that various changes in the form, number and arrangement of parts may be made within the spirit and scope thereof.

What is claimed is:

1. As an article of manufacture, a wishbone for forming a suspension between a vehicle frame and a vehicle wheel comprising divergent leg members and a stiffening strut connecting said leg members at their divergent ends, said legs and strut members being formed of metal stampings.

2. As an article of manufacture, a wishbone for forming a suspension between a vehicle frame and a spindle associated with a vehicle wheel comprising a metal stamping bent to define an eye for connection with said spindle and a pair of divergent legs, openings formed in said legs adapting them for connection to said frame, and an additional connection between said legs adjacent said eye to strengthen said eye.

3. As an article of manufacture, a wishbone for forming a suspension between a vehicle frame and a spindle associated with the vehicle wheel comprising a metal stamping bent to define an eye to form a connection with said spindle and a pair of diverging legs, and a second metal stamping bent to form a stiffening strut for connection to said legs respectively.

4. As an article of manufacture, a wishbone for forming a connecting link between a vehicle frame and a steering wheel spindle, comprising an intergral strap-like metal strip bent intermediate its ends in a plane parallel to the edge of the strip to form a closed eye, and having its ends diverging from the eye in said plane at an angle to each other to form legs for connection to the vehicle frame.

5. As an article of manufacture, a wishbone for forming a suspension between a vehicle frame and a spindle associated with the vehicle wheel comprising a metal stamping bent to define an eye to form a connection with said spindle and a pair of diverging legs, and a second metal stamping bent to substantially U-form and having the legs of the U shaped stamping secured face-to-face with and extending in the same direction as the legs of said first stamping, respectively.

6. As an article of manufacture, a wishbone for forming a suspension between a vehicle frame and a spindle associated with the vehicle wheel comprising a metal stamping bent to define an eye to form a connection with said spindle and a pair of diverging legs, and a second metal stamping bent to substantially U-form and having the legs of the U-shaped stamping secured face-to-face with and extending in the same direction as the legs of said first stamping, respectively, the extremities of the legs of said wishbone being provided with openings extending through the legs of both stampings for pivotally connecting said wishbone to the vehicle frame.

JOHN W. LEIGHTON.